US012590016B2

(12) United States Patent
Moretto

(10) Patent No.: US 12,590,016 B2
(45) Date of Patent: **\*Mar. 31, 2026**

(54) FILTERING CONTAINER FOR LIQUIDS

(71) Applicant: LAICA S.P.A., Barbarano Mossano (IT)

(72) Inventor: Maurizio Moretto, Vicenza (IT)

(73) Assignee: LAICA S.P.A., Barbarano Mossano (IT)

( * ) Notice: Subject to any disclaimer, the term of this patent is extended or adjusted under 35 U.S.C. 154(b) by 344 days.

This patent is subject to a terminal disclaimer.

(21) Appl. No.: 18/004,718

(22) PCT Filed: Jul. 12, 2021

(86) PCT No.: PCT/IB2021/056250
§ 371 (c)(1),
(2) Date: Jan. 9, 2023

(87) PCT Pub. No.: WO2022/009184
PCT Pub. Date: Jan. 13, 2022

(65) Prior Publication Data
US 2023/0242415 A1      Aug. 3, 2023

(30) Foreign Application Priority Data
Jul. 10, 2020      (IT) ......................... 102020000016870

(51) Int. Cl.
*C02F 1/00*               (2023.01)
(52) U.S. Cl.
CPC ........   *C02F 1/003* (2013.01); *C02F 2201/005* (2013.01); *C02F 2307/02* (2013.01)
(58) Field of Classification Search
CPC ................ C02F 1/003; C02F 2201/005; C02F 2307/02; C02F 1/28; C02F 2201/002; C02F 1/002; C02F 2307/04
See application file for complete search history.

(56) References Cited

U.S. PATENT DOCUMENTS 6,565,743 B1     5/2003   Poirier
12,151,951 B2 *  11/2024  Moretto ................. B65D 47/32
(Continued)

FOREIGN PATENT DOCUMENTS

CN          206355705 U        7/2017
CN          208192692 U        12/2018
(Continued)

OTHER PUBLICATIONS

International Search Report, International Application No. PCT/IB2021/056250, Sep. 20, 2021.
(Continued)

*Primary Examiner* — Hayden Brewster
(74) *Attorney, Agent, or Firm* — Flener IP & Business Law

(57)                ABSTRACT

A filtering container for liquids, in particular water, comprising a main body, a gripping portion which is configured to be gripped by a user for lifting the container and pouring the liquid contained therein out of it, a closure group of an opening which is defined in the main body and which includes a filtering element which is arranged in such a position as to intercept the liquid being discharged from the main body, dispensing means for the liquid which are configured in such a manner that the liquid is dispensed through a dispensing zone for the liquid defined adjacent to a side wall of the main body and a ventilation pipe which opens inside the main body in a ventilation zone and which extends in the form of an elongate element towards the interior of the main body.

18 Claims, 15 Drawing Sheets

(56)  References Cited

U.S. PATENT DOCUMENTS

| | | | |
|---|---|---|---|
| 2002/0060176 A1* | 5/2002 | Mierau | ................... C02F 1/288 |
| | | | 210/493.1 |
| 2008/0203007 A1 | 8/2008 | Jang | |
| 2010/0219151 A1* | 9/2010 | Risheq | .................... C02F 1/003 |
| | | | 210/348 |
| 2016/0031721 A1* | 2/2016 | Kellam | ..................... C02F 1/42 |
| | | | 210/244 |
| 2017/0239679 A1 | 8/2017 | Bierie | |
| 2018/0044201 A1 | 2/2018 | Metaxatos | |
| 2018/0200653 A1 | 7/2018 | Park | |

FOREIGN PATENT DOCUMENTS

| | | | |
|---|---|---|---|
| WO | 0230766 A2 | 4/2002 |
| WO | 2002030766 A2 | 4/2002 |
| WO | 2006031838 A1 | 3/2006 |
| WO | 2010098984 A1 | 9/2010 |
| WO | 2010142473 A1 | 12/2010 |
| WO | 2014144191 A1 | 9/2014 |
| WO | 2017053588 A1 | 3/2017 |
| WO | 2020144642 A1 | 7/2020 |

OTHER PUBLICATIONS

Written Opinion of the International Searching Authority, International Application No., PCT/IB2021/056250, Sep. 20, 2021.
International Search Report for PCT/IB2020/050186, issued Mar. 5, 2020.

* cited by examiner

FILTERING CONTAINER FOR LIQUIDS

The present invention relates to a filtering container for liquids, in particular water, of the type comprising a main body and a filtering element which is arranged so as to intercept the water being discharged from an opening formed in the main body.

In the context of water treatment, there are widely used various filtration solutions which are directed towards removing undesirable substances present therein and/or improving the characteristics and the flavour thereof. Typically, this need is linked with the desire to improve the quality of the water which is supplied by the public water distribution service. To this end, filtering beds are used, for example, of the type with ion exchange or activated carbon.

One of the main difficulties linked with such filtration systems is connected with the need to provide the sufficient hydrostatic thrust to the water so that it passes through the filtering surface which, by its very nature, constitutes an obstacle to the passage of the water.

A possible solution is constituted by the so-called percolation filtering systems, such as, for example, the one described in WO 2010/142473 A1, in which the action of gravitational force is used for passing the water from an upper tank to a lower tank by passing through a filtering bed. It is evident that this solution, while effective, requires a specific time for filtering the water, an ion exchange filtering bed typically being used.

An additional solution, frequently used in flasks for sporting activity, is constituted by using a container with deformable walls, in which a filter is arranged at the outlet from the container.

By pressing the walls it is therefore possible to force the water through the filter and to cause it to leave the container in a virtually instantaneous manner.

There are also known solutions in which the container is further provided with a mono-directional valve which allows the intake of air but not the discharge of liquids so as to allow the walls of the container to return to a non-deformed condition.

An example of this filtering system is described in the American patent U.S. Pat. No. 6,565,743.

An additional solution used in flasks provides for using containers with rigid walls which are combined with a straw, via which the user can suck the liquid.

Examples of these flasks are described in US 2018/044201, US 2008/203007, WO 2006/031838 and US 2016/031721.

However, it is evident that such a solution may be suitable in the context of a flask to be used in a sporting environment, but is not suitable for other situations, such as, for example, for common domestic use.

However, it would be desirable to be able to provide filtering systems in which the filtration takes place with sufficient speed without any need to subject the liquid to additional pressures except hydrostatic pressure.

Therefore, the problem addressed by the present invention is to provide a filtering container which is structurally and functionally configured to overcome one or more of the disadvantages set out with reference to the cited prior art. Another object is to provide a filtering container which can ensure filtration of the liquid and subsequent dispensing which is sufficiently rapid for normal domestic uses and in particular food uses.

Another object is to provide a filtering container in which the filtering and the dispensing of the liquid can take place without additional forces on the liquid, apart from the hydrostatic thrust.

Another object of the present invention is to provide a filtering container which can readily be used by the user, for example, for consuming water at the table.

This problem is solved and these objects are achieved by the invention by means of a filtering container comprising a main body, a gripping portion which is configured to be gripped by a user for lifting the container and pouring the liquid contained therein out of it, a closure group of an opening which is defined in the main body and which includes a filtering element which is arranged in such a position as to intercept the liquid being discharged from the main body, dispensing means for the liquid which are configured in such a manner that the liquid is dispensed through a dispensing zone for the liquid which is defined adjacent to a side wall of the main body and a ventilation pipe which opens inside the main body in a ventilation zone and which extends in the form of an elongate element towards the interior of the main body, the ventilation pipe comprising a non-return valve which is arranged at an end thereof which opens inside the main body.

In fact, it will be appreciated that the presence of a ventilation pipe which opens inside the main body in a ventilation zone allows the inflow of air inside the container to be ensured during the dispensing of the liquid, promoting the normal flow of liquid being discharged from the container notwithstanding the presence of the filtering element. Furthermore, if the opening of the ventilation pipe is wetted by the liquid, as a result of the elongate development of the pipe, in the form of an elongate element towards the interior of the main body of the container, the hydrostatic pressure which acts in the region of the pipe is also less than the one acting on the filter. This allows an improvement of the flow by allowing a simpler inflow of air inside the container.

The dispensing zone is further preferably arranged adjacent to a side wall of the main body of the container in such a manner that the dispensing of the liquid can naturally be brought about by means of lateral inclination of the container. Preferably, the ventilation zone is arranged in a position opposite the dispensing zone so as to optimize the intake of air, counter-balancing the pressure of the water or other liquid being dispensed.

In some embodiments, the filtering container is configured in such a manner that the discharge of the liquid takes place simply by inclining the main body of the container.

Preferably, the closure group is fixed in a removable manner to the main body in the region of the opening and the filtering element is preferably connected to the closure group so as to be removed together therewith.

According to an aspect of the invention, the opening of the main body is developed over a planar surface, with the dispensing zone and the ventilation zone being arranged in opposite positions with respect to the planar surface itself. Preferably, the dispensing pipe has a cross-section which is smaller than the dimension of the dispensing zone in such a manner that the presence of the dispensing pipe does not prevent the contact between the water and the dispensing zone. Preferably, when the container is in abutment against a planar surface, the opening of the ventilation pipe inside the main body is arranged in a lower position with respect to the filtering element. More generally, the ventilation pipe can open inside the main body in a distal position with respect to the opening.

According to another aspect, the ventilation pipe comprises a cannula or tube which extends inside the main body.

In some embodiments, the ventilation pipe which may be formed by the above-mentioned cannula extends inside the main body over a distance of ⅕, preferably ⅒, of the longitudinal extent of the main body. In preferred embodiments, the main body has a circular cross-section in the region of the opening. Preferably, the dispensing group is connected to the opening by means of a threaded connection. This simplifies the construction of the container and where applicable allows the closure group, which may where applicable be adapted to different containers, to be made interchangeable.

In some embodiments, the closure group and the dispensing group are connected in a stable manner to each other. Preferably, the dispensing group may be removed from the main body by removing the closure group itself.

According to another aspect of the invention, the filtering element has a flat form and is preferably received in a removable manner in a housing which is defined in the closure group. In some embodiments, the filtering element is of disk-like form. These characteristics allow ready replacement of the filtering element following depletion of the filtering power thereof.

According to a preferred embodiment, the ventilation pipe extends inside the main body adjacent to a portion of the side wall of the main body near the ventilation zone and opens inside the main body in a distal position with respect to the opening. This allows the risk that the liquid which is present in the container may be discharged directly from the ventilation pipe when the container is inclined in order to pour out the contents to be prevented or in any case reduced.

Preferably, the dispensing means comprise a dispensing spout which is formed on the closure group. In some embodiments, the spout is developed transversely with respect to an axial development direction of the main body.

According to another aspect of the invention, the closure group comprises a cap for alternatively affording or preventing access to the housing of the filtering element. In a preferred embodiment, there is defined between the cap and the filtering element a storage chamber in which the fluid is collected during discharge from the filtering element. The dispensing spout is arranged laterally with respect to the storage chamber. In this manner, the fluid flow being discharged from the container can take place in a more gradual manner.

According to yet another aspect, the ventilation pipe has a constriction which can obstruct the passage of water being discharged from the main body through the pipe itself. In this manner, the risk that non-filtered liquid which has passed through the ventilation pipe may be poured out is minimized.

Preferably, the main body is constructed in a rigid manner, allowing the container to be readily gripped and to be able to be inclined in order to pour the contents out of it.

In some embodiments, the opening defines the single passage for the liquid being introduced into and being discharged from the main body. In other words, the liquid is introduced and poured out inside the main body of the container by means of the opening.

On the basis of another aspect of the invention, there is provision for the presence of a ventilation pipe which opens inside the main body in a ventilation zone which is arranged in a different position with respect to the dispensing zone of the liquid to allow the inflow of air inside the container to be ensured during the dispensing of the liquid, promoting the normal flow of liquid being discharged from the container notwithstanding the presence of the filtering element.

Preferably, the end of the ventilation pipe provided with the non-return valve is arranged upstream with respect to the filtering element along a discharge path of the liquid from the filtering container. This discharge path is preferably defined by the path which the liquid defines towards the outlet of the container when it is inclined laterally.

In some embodiments, the ventilation zone may be arranged centrally with respect to the surface on which the opening is developed, taking into account the peripheral positioning of the dispensing zone.

On the basis of a preferred embodiment, the filtering container is configured in such a manner that the discharge of the liquid takes place simply by inclining the main body of the container.

According to another aspect of the invention, the opening of the main body is closed by means of a closure group which preferably has an upper wall. Therefore, there is defined between the upper wall and the filtering element of the container a storage chamber in which the fluid is collected during discharge from the filtering element.

According to a preferred embodiment, the ventilation pipe opens inside the storage chamber.

Preferably, the storage chamber has a flat form and a height of at least 0.6 mm.

According to another aspect of the invention, the ratio between the height and the area of the filtering surface defined by the filtering element is greater than ⅟₂₀₀.

The Applicant has observed that the presence of one or more such features allows the air to be made to flow through the ventilation pipe without the discharge of the water obstructing the regular flow thereof. In particular, the characteristics of the storage chamber are such as to allow the simultaneous passage of water and air, thereby allowing a rapid and regular dispensing of the liquid.

According to an aspect of the invention, the opening of the main body is developed over a planar surface, with the dispensing zone and the ventilation zone being arranged in opposite positions with respect to the planar surface itself. In preferred embodiments, the main body has a circular cross-section in the region of the opening. Preferably, the dispensing group is connected to the opening by means of a threaded connection. This simplifies the construction of the container and where applicable allows the closure group, which may where applicable be adapted to different containers, to be made interchangeable.

According to another aspect of the invention, the filtering element has a flat form and is preferably received in a removable manner in a housing which is defined in the closure group. This feature allows ready replacement of the filtering element following depletion of the filtering power thereof. Preferably, the ventilation pipe and the filtering element define passages between the interior of the main body and the exterior of the main body which are parallel and different. In other words, the air and the liquid can be introduced into and discharged from the main body, respectively, through two different paths in such a manner that the passage of air and liquid being introduced/discharged into/from the main body can be brought about simultaneously. In this manner, it is possible to ensure a correct flow of air towards the main body while the liquid present inside it is poured out.

Preferred features of the invention are generally defined by the dependent claims.

The features and advantages of the invention will be better appreciated from the detailed description of a number of embodiments thereof which are illustrated by way of non-limiting example with reference to the appended drawings, in which.

Figures 1, 1A, 1B:
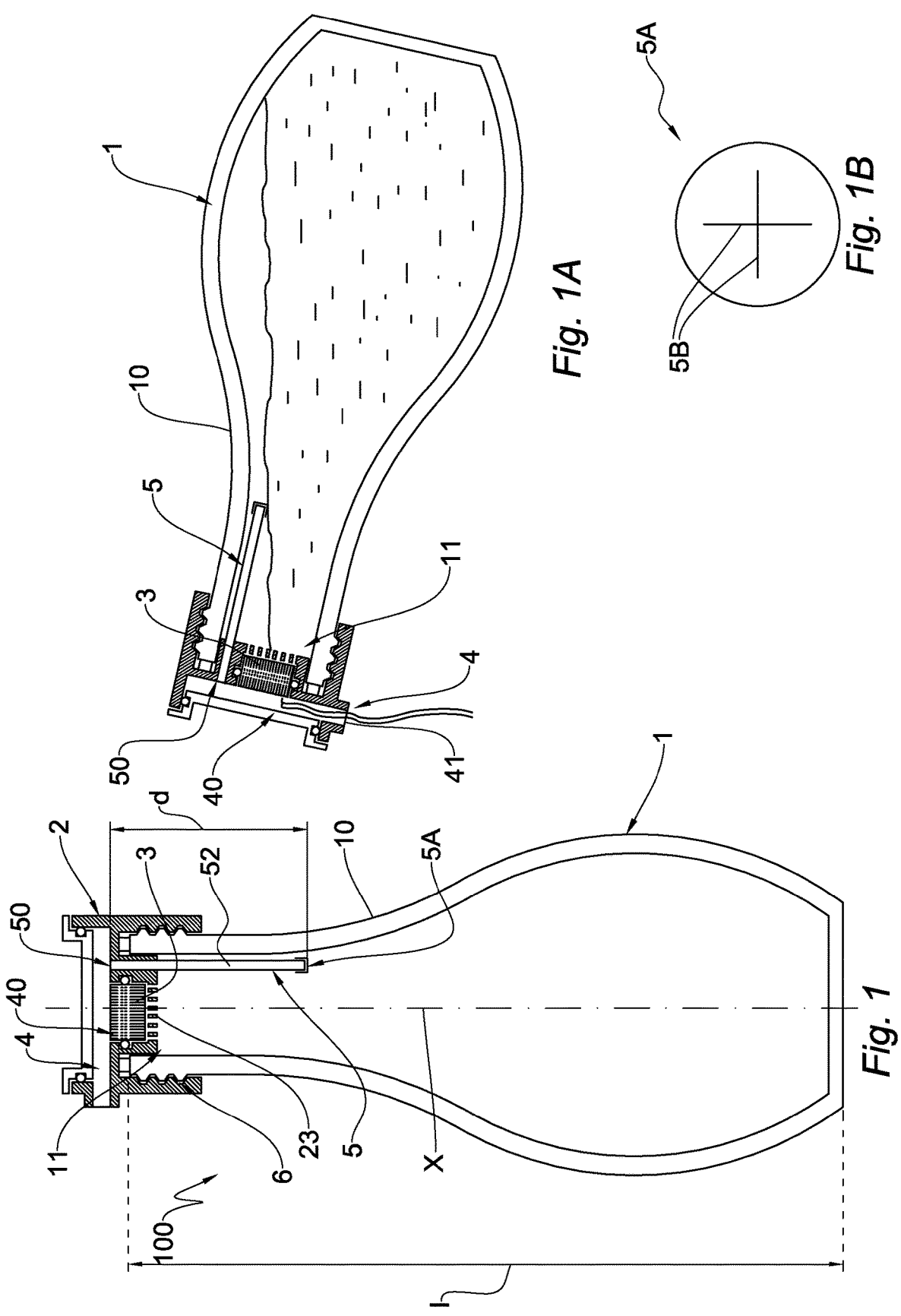
FIG. 1 is a cross-section of a filtering container according to the invention.
FIG. 1A is a cross-section which illustrates the container of the present invention when the liquid present therein is poured out.
FIG. 1B is a detailed front view of a non-return valve, a detail of the container of FIG. 1.
Figures 1C, 1D, 1E, 1F, 1G, 1H:
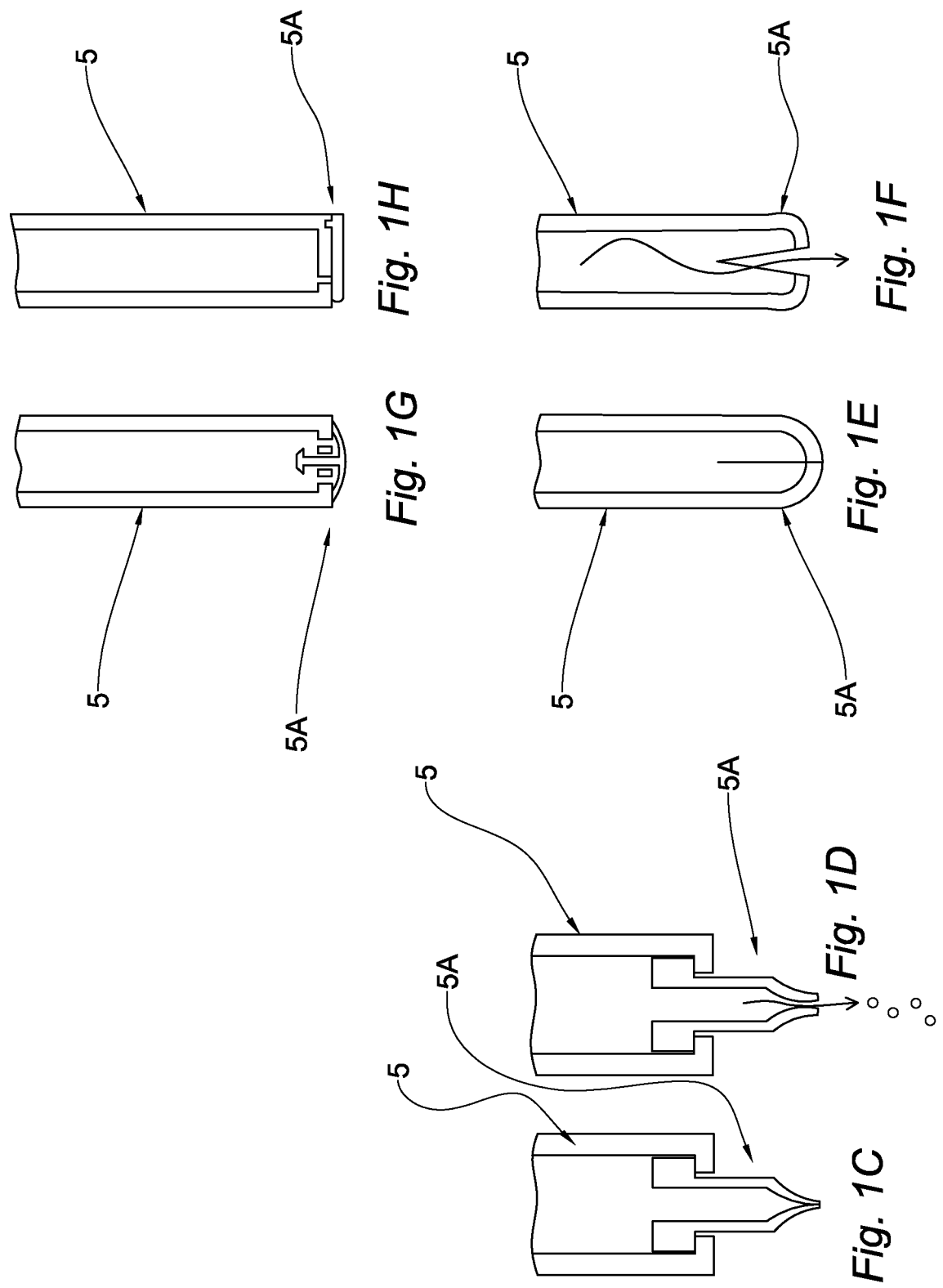
FIGS. 1C to 1H are construction variants, the first two being illustrated both in a closed position and in a passage position, of the non-return valve of FIG. 1B.

Initially with reference to FIG. 1, a filtering container is generally designated 100.

The container 1 can be, for example, formed in the manner of a bottle or jug and comprises a main body 1 which defines a space which is intended to contain the liquid to be filtered. More generally, the container 100 comprises a gripping portion 10 via which the container can be gripped and lifted so as to pour out the liquid contained therein. To this end, the main body 1 can advantageously be constructed from rigid material, such as, for example, a thermoplastic or glass material.

The gripping portion 10 may be formed from a suitably shaped portion of the main body 1, as in the example illustrated in the Figures, or by a handle or the like.

There is preferably defined in the main body 1 a main axis X which can be constituted by the longitudinal development axis or by an axially symmetrical axis of the main body 1 itself. In preferred embodiments, the main body 1 defines an opening 11, which is formed, for example, in the region of an upper end of the body 1 itself. It may be noted that, in the context of the present invention, the adjective "upper" is intended to refer to the highest portion of the container when it is supported on a planar surface, parallel with the horizontal, such as, for example, a table.

The container 100 further comprises a closure group 2 which is arranged so as to close the opening 11 in accordance with methods which will be set out in greater detail below. Advantageously, the closure group 2 may be connected to the opening 11 by means of a threaded connection 6 and, to this end, the main body 1 may be provided with a circular cross-section in the region of the opening 11. Other connection solutions which are illustrated in the alternative embodiments of FIGS. 6, 7, 8, 9, 15 and 16 may provide for bayonet type connections, restrained type and snap-fit type connections and the like.

Figures 2, 3:
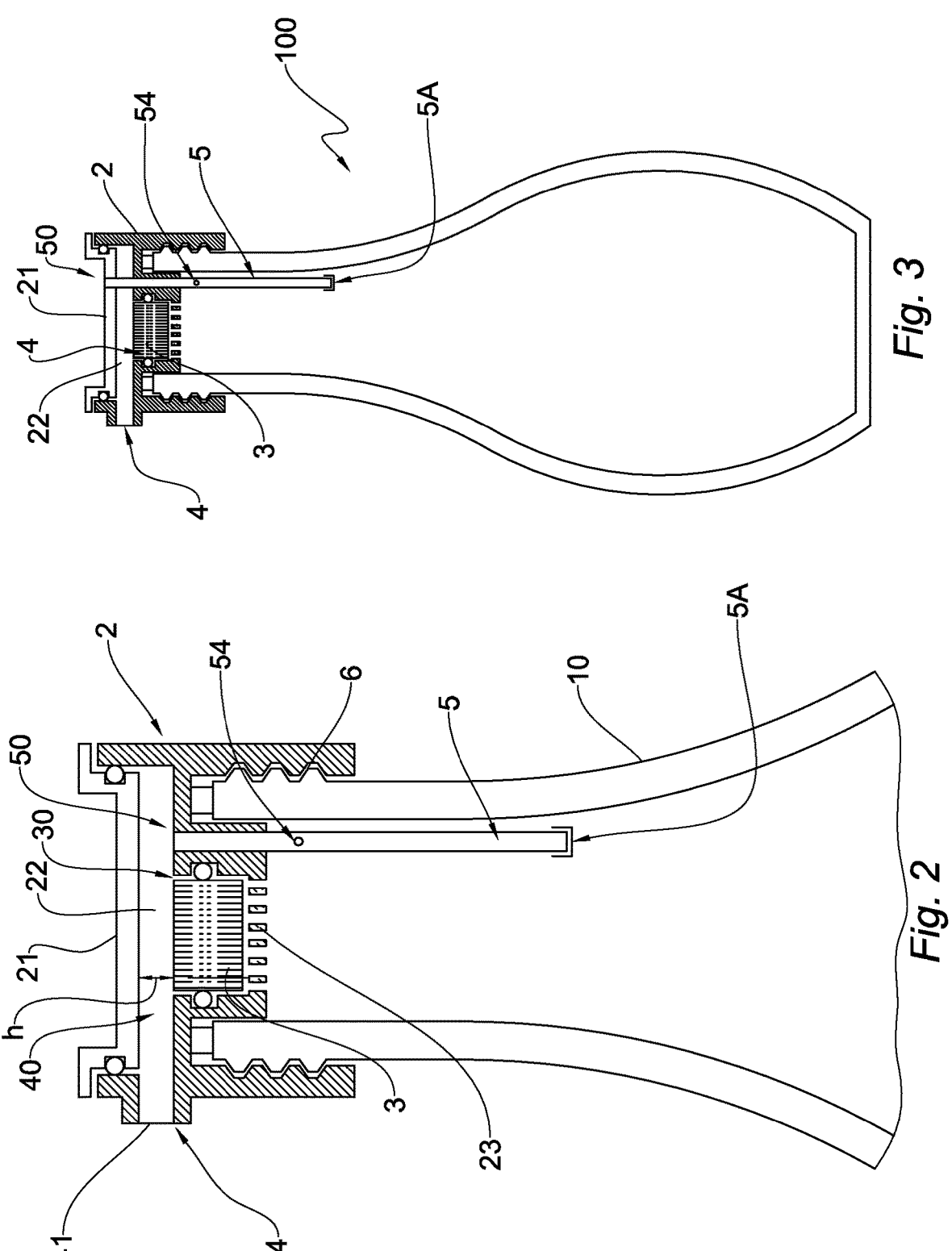
FIG. 2 is a detailed view of the filtering container of FIG. 1.
FIGS. 3 to 15 are cross-sections of alternative embodiments of the filtering container of the present invention.

The closure group, which is illustrated more clearly in a preferred embodiment thereof in FIG. 2, comprises a filtering element 3 which is arranged in such a position as to intercept the liquid being discharged from the main body 1. As may be observed in FIG. 1A, when the container 100 is inclined, the liquid present therein wets the closure group 2, reaching the filtering element 3 which can be passed through by the liquid and thereby filtered.

By way of example, the filtering element 3 can be formed by an activated carbon filter, a filter of the carbon block type, fabric impregnated with carbon, fabric impregnated with resin, fabric impregnated with resin and carbon, antibacterial fabrics with a magnetic charge, granular or powdered materials, microporous materials, membranes. Naturally, the list is provided in a non-exhaustive manner and the present invention may also be used similarly in the case of other filtering materials.

In some embodiments, the filtering element 3 has a flat form which is arranged parallel with the outlet section from the opening 11. In this manner, the contact zone can be maximized between the liquid and the filtering surface of the element 3 when the container 100 is inclined.

As may be appreciated in construction variants, some of which are illustrated in the other Figures, however, there may also be provided filtering elements of elongate form, for example, of cylindrical form.

In some embodiments, the filtering element 3 may be received in a removable manner in a housing 30 which is defined in the closure group 2. This housing may be, for example, formed by a cavity, to which access can be afforded by removing a suitable cap 21. Preferably, the filtering element 3 is arranged in abutment against a mesh surface which defines a base of the housing. This is particularly advantageous because it allows an additional filtration of the liquid to be carried out before it reaches the filtering element 3 and the filtering element 3 itself to be supported in a suitable manner.

According to a preferred embodiment, the closure group 2 also comprises a dispensing spout 41, through which the liquid is poured out when the container 100 is inclined. Preferably, the spout is developed transversely with respect to the axial development X of the main body 1.

In other words, the spout 41 is arranged laterally with respect to the opening 11 in such a manner that the container 100 is configured so as to be able to pour out the liquid following inclination thereof in the direction of the spout 41, as, for example, illustrated in FIG. 1A.

More generally, there may be present dispensing means 4 which are configured in such a manner that the liquid is dispensed through a dispensing zone 40 of the liquid, which is defined adjacent to a side wall of the main body 1. It may be noted, for example, how in the embodiment of FIGS. 1 and 1A the dispensing zone 40 is defined adjacent to the wall of the main body 1 near the opening 11.

It may be noted that there may be provided alternative solutions for the dispensing means 4 with respect to the spout of the present embodiment. For example, the dispensing means may be formed, or more generally may comprise, an outlet channel for the fluid from the closure group or an outlet opening which is constructed differently. Furthermore, the dispensing means may be constituted by any element which is suitable for imposing or in any case promoting the pouring of the liquid by means of a preferred inclination. For example, the presence of a grip or a suitably constructed handle may, even in the absence of the spout 41, ensure that there is uniquely defined a dispensing zone 40 which is similar to the one described in relation to the present embodiment.

Now with reference to FIG. 2, in preferred embodiments there is also provided a storage chamber 22 between the cap 21 and the filtering element 3. The storage chamber 22 is substantially formed by a space which is defined between the filtering element 3 and cap 21 when it is arranged so as to close the closure group 12.

When the liquid is poured out, the fluid is collected during discharge by the filtering element 3, the dispensing spout 41 being arranged laterally relative to the storage chamber 22. Therefore, it will be appreciated that, when the liquid present in the container is poured out, inside the storage chamber 22, on the one hand, the filtered liquid passes out while, on the other hand, the passage of air towards the interior of the container is brought about.

The Applicant has found that, in order to optimize the passage of the liquid and the air, the storage chamber 22 may have a flat shape and a height h which is preferably equal to at least 6 mm, in accordance with what is illustrated in FIG. 1A.

Furthermore, also with reference to FIG. 3A, in some embodiments the area of the filtering surface of the filtering element 3 has such dimensions that the ratio between the height h and the area A of the filtering surface is greater than ¹/₂₀₀.

The container 100 of the present invention further comprises a ventilation pipe 5 which opens inside the main body 1 in a ventilation zone 50 which is arranged in a position opposite the dispensing zone 40 of the liquid.

In some situations, in accordance with the form of the container, it may be the case that the ventilation pipe comes into contact with the liquid and, therefore, in some embodiments, in order to prevent the discharge of liquid from the container without it passing through the filtering element, there may be provision for the presence of a non-return valve 5A.

This non-return valve 5A may, for example, be formed by a closure element which is arranged at the end of the ventilation pipe which opens inside the container and on which there is/are formed at least one notch, preferably two, which define(s) flaps which are deformable in the discharge direction from the ventilation pipe.

In some embodiments, the non-return valve may generally comprise a flexible element which is deformed following the action of the air being discharged from the ventilation pipe 5. Some of these embodiments are illustrated in FIGS. 1C to 1H.

Again with reference to FIG. 1, in the embodiment in which the opening 11 has a circular cross-section, the ventilation zone 50 is arranged in a position opposite the dispensing zone 40, each one being near the external edge of the opening 11.

More generally, in a preferred embodiment, the opening 11 of the main body 1 is developed over a planar surface, with the dispensing zone 40 and the ventilation zone 50 being arranged in opposite positions with respect to the planar surface defined in this manner.

As clearly illustrated in FIG. 1A, the ventilation pipe 5 allows the introduction of air inside the container during the emptying thereof so as to counterbalance the pressure therein. This promotes the discharge speed of the liquid which is capable of more readily overcoming the resistance to the passage thereof caused by the filtering element 3. The provision of a flat filtering element also allows an increase in the discharge speed of the liquid from the container.

In an embodiment, the ventilation pipe 5 extends inside the main body 11 adjacent to the side wall of the main body 1 near the ventilation zone 50. Preferably, the ventilation pipe 5 opens inside the main body 1 in a distal position with respect to the opening 11.

In some embodiments, the ventilation pipe 5 comprises an intermediate vent hole 54 which is positioned in an intermediate position between the two opposite ends of the pipe 5.

In the region of the opposite end, therefore, the ventilation pipe 5 has an opening which allows the interior of the container 100 to be placed in communication with the exterior without passing through the filtering element.

Preferably, the dispensing pipe 5 has a cross-section which is less than the dimension of the dispensing zone 40 or the filtering element zone which is wetted when the liquid is poured out in such a manner that the presence of the dispensing pipe does not prevent the contact between the water and the dispensing zone.

It will be further appreciated that, as may be observed in the Figures, when the container is in abutment against a planar surface, the opening of the ventilation pipe inside the main body is preferably arranged in a lower position with respect to the filtering element. More generally, the ventilation pipe may open inside the main body in a distal position with respect to the opening.

According to another aspect, the ventilation pipe 5 comprises a cannula 52 or a tube which extends inside the main body 1. The cannula 52 is preferably formed by an element which is fixed to a lower wall of the closure group 2.

In some embodiments, the cannula 52 or more generally the ventilation pipe 5 may extend inside the main body over a distance d of ¹/₁₅, preferably ¹/₁₀, of the longitudinal extent 1 of the main body.

Additional embodiments of the ventilation pipe 5 are illustrated in FIGS. 3 to 15.

In the embodiment of FIG. 3, the ventilation pipe 5 extends through the cap 21 so as to place the interior of the container 100 directly in communication with the exterior. In other words, the end of the ventilation pipe 11 opposite the one which opens inside the container 100 opens above the cap 21.

In such a situation, in accordance with the form of the container, it may be easier for the ventilation pipe to come into contact with the liquid and, in order to prevent the discharge of liquid from the container without it passing through the filtering element, there may be provision for the presence of a non-return valve. It may be noted that the non-return valve may also be used in different embodiments, such as, for example, the one in FIG. 1.

In some embodiments, the ventilation pipe 5 may be directly arranged in the region of the main body 1 of the container 100.

Preferably, the filtering element 3 extends inside the main body 1, below the opening 11.

In some embodiments, in which the main body 1 has a neck-like portion, the filtering element 3 may be fixed to a support 31 so that the filtering element 3 extends during use below the neck-like portion.

In the embodiment depicted in FIG. 5, there is used a filtering element which is similar to the one of FIG. 4 but there is instead provided a support 31' so that the filtering element 3 is supported and configured so as to be partially received in the neck-like portion and partially below it.

Figure 6:
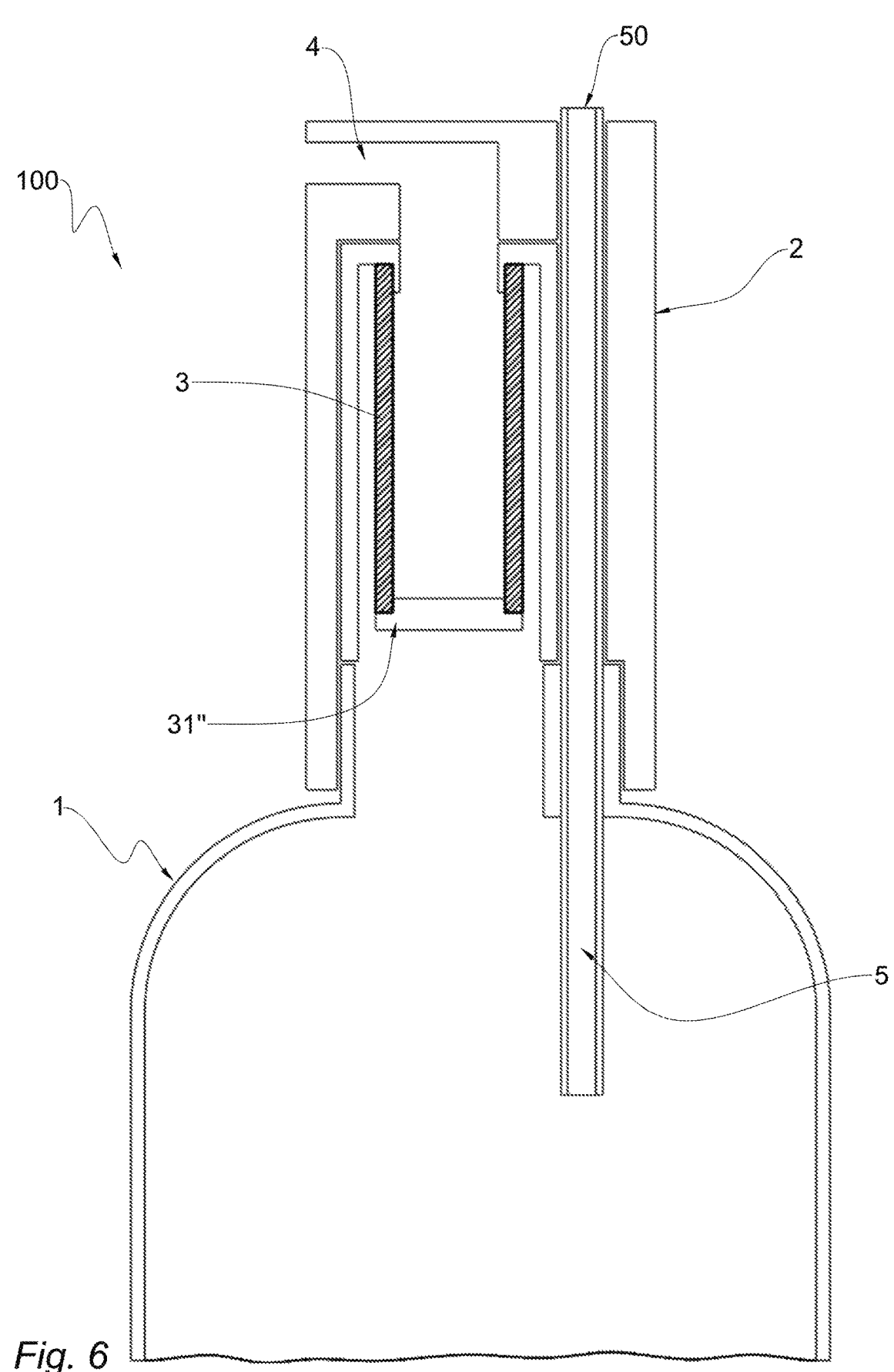

In the embodiment depicted in FIG. 6, there is instead used a support 31", by means of which the filtering element is entirely received inside the neck-like portion.

Figure 4:
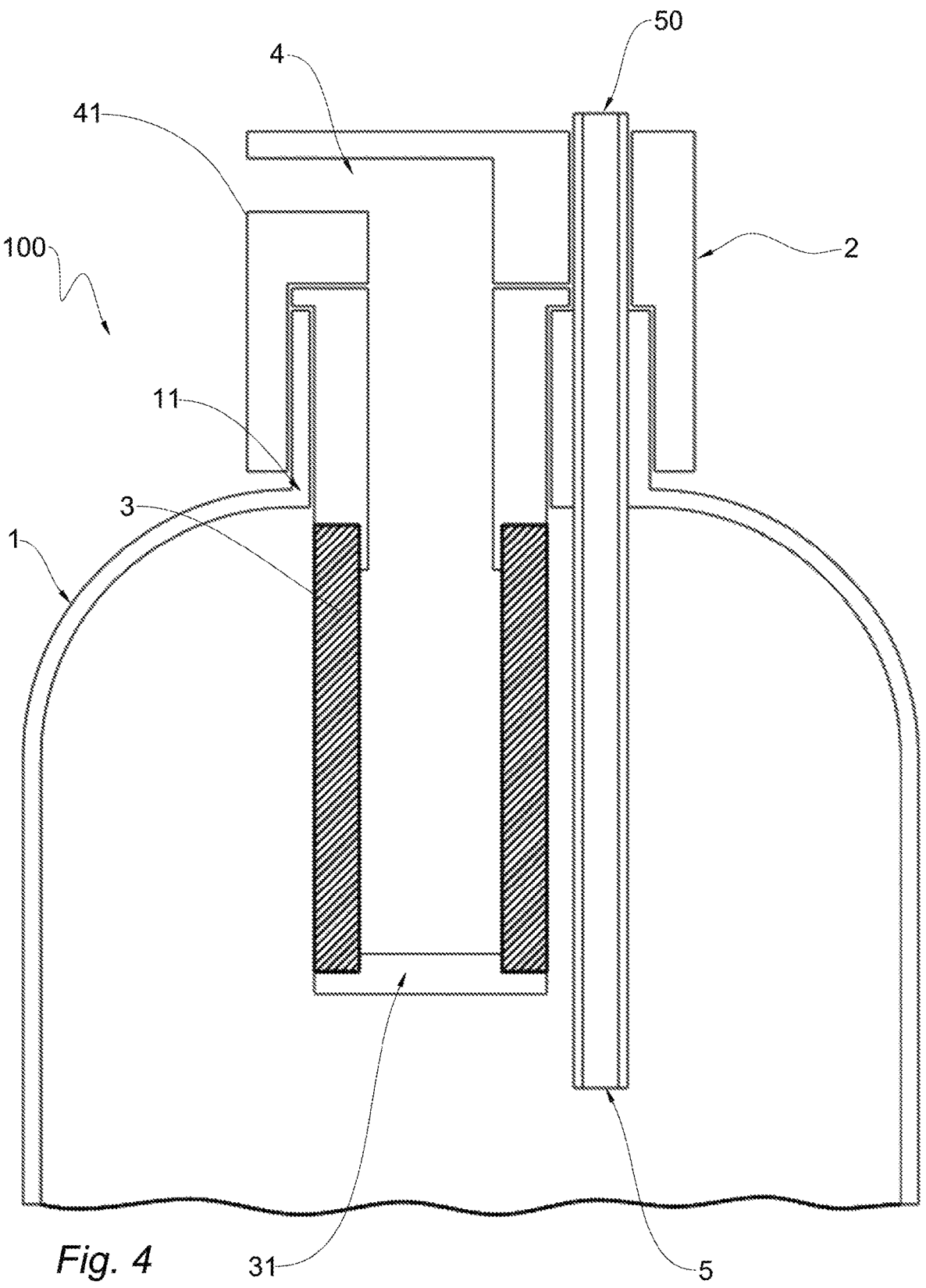
Figure 5:
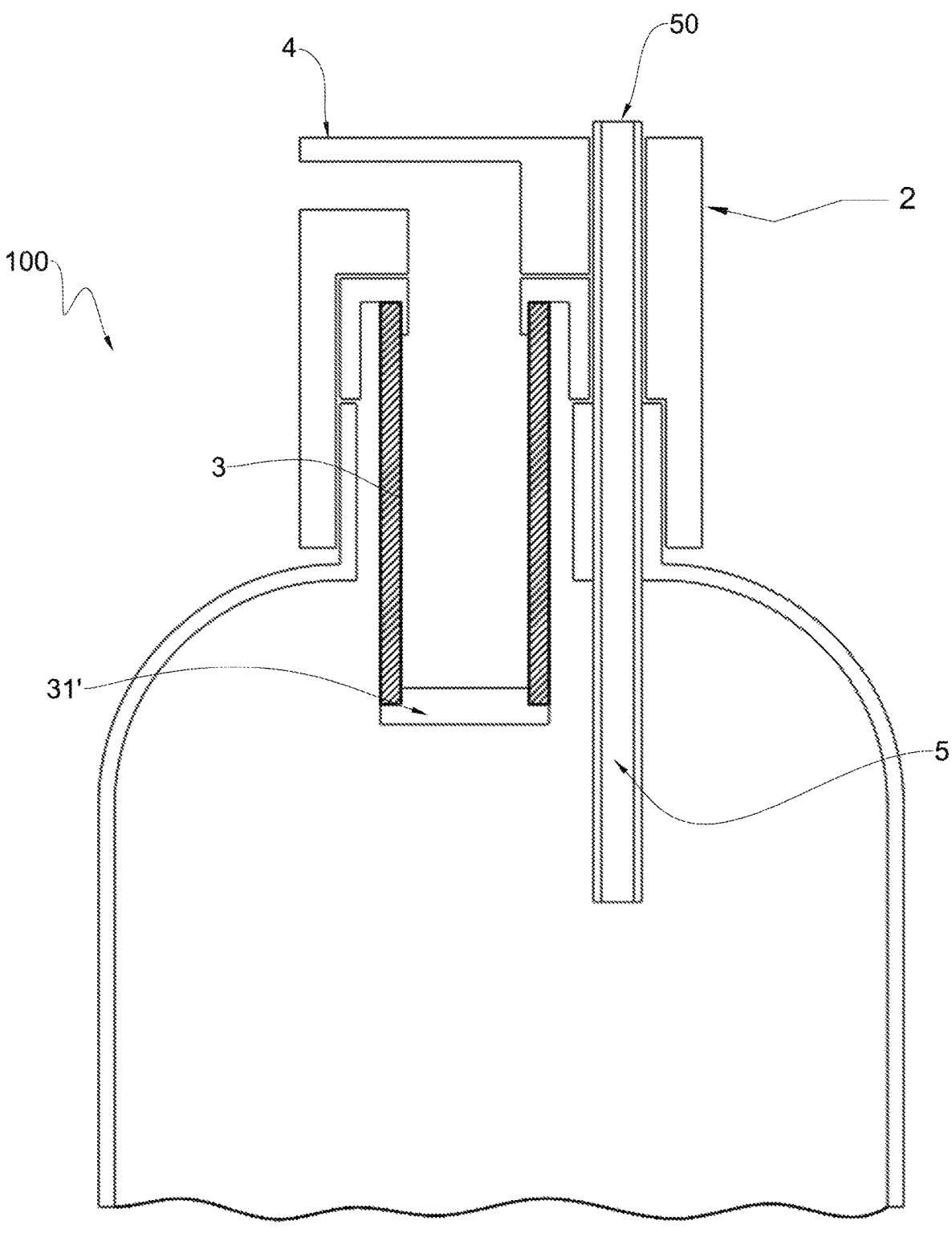
Figure 7:
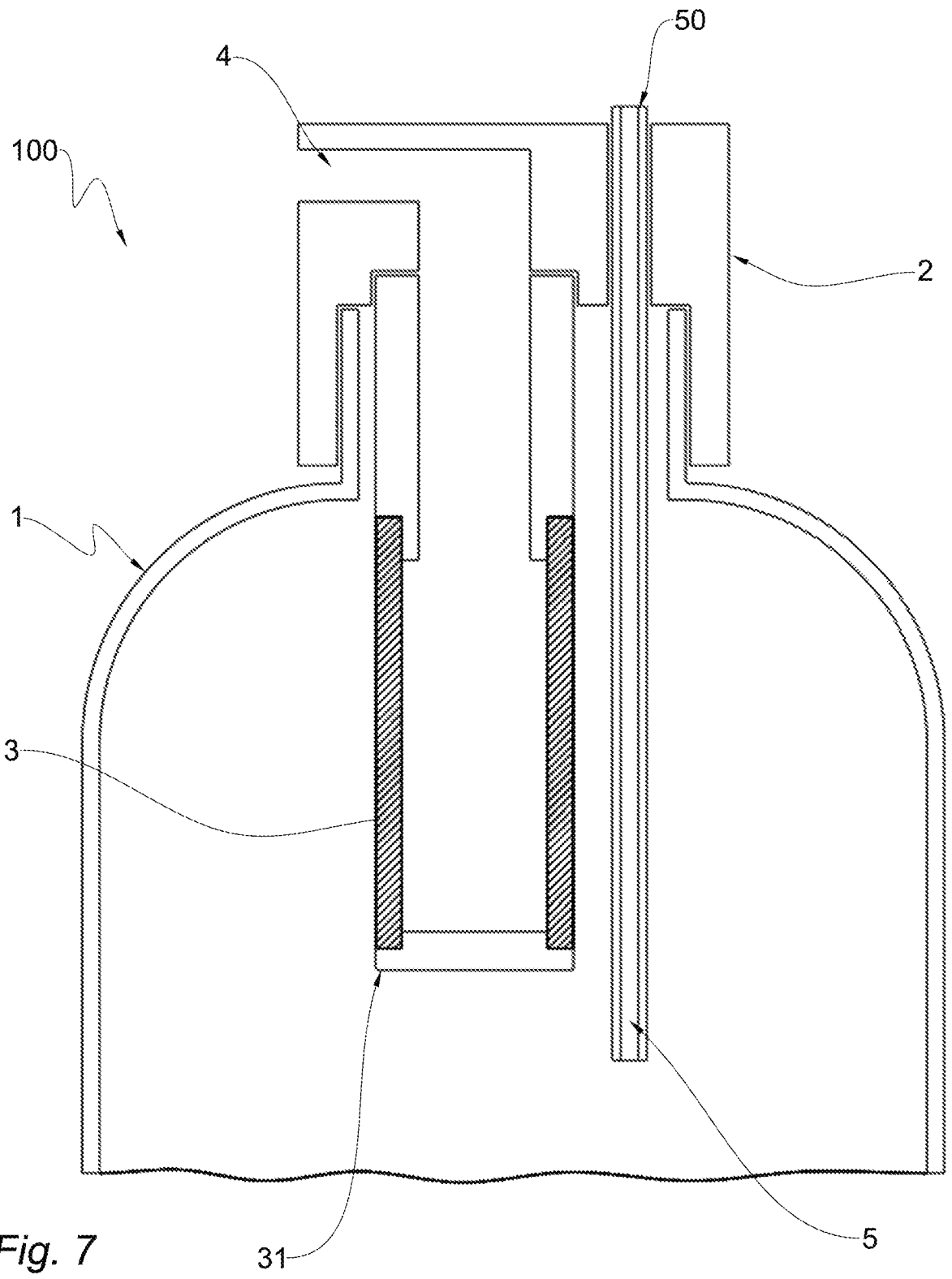
Figure 8:
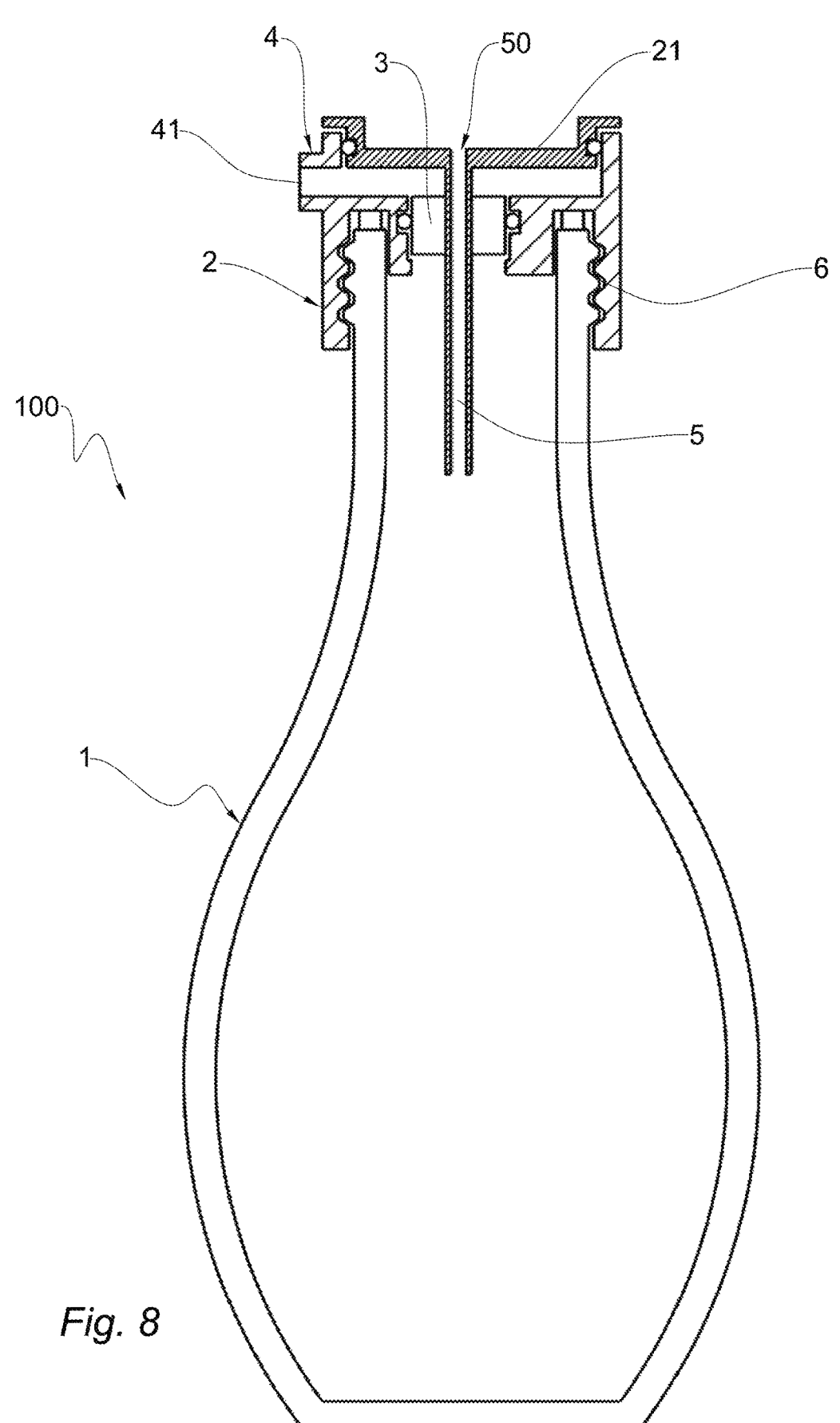

In the embodiment depicted in FIG. 7, there is used a filtering element similar to the one described in relation to FIG. 4, but with the ventilation pipe fixed to the closure group 2.

On the basis of an additional construction variant, the ventilation pipe may also extend inside the filtering element. In some embodiments, such as the one depicted in FIG. 8, the cannula 52 is an integral part of the cap 21 and the ventilation pipe 5 extends through the cap 21.

Figure 9:
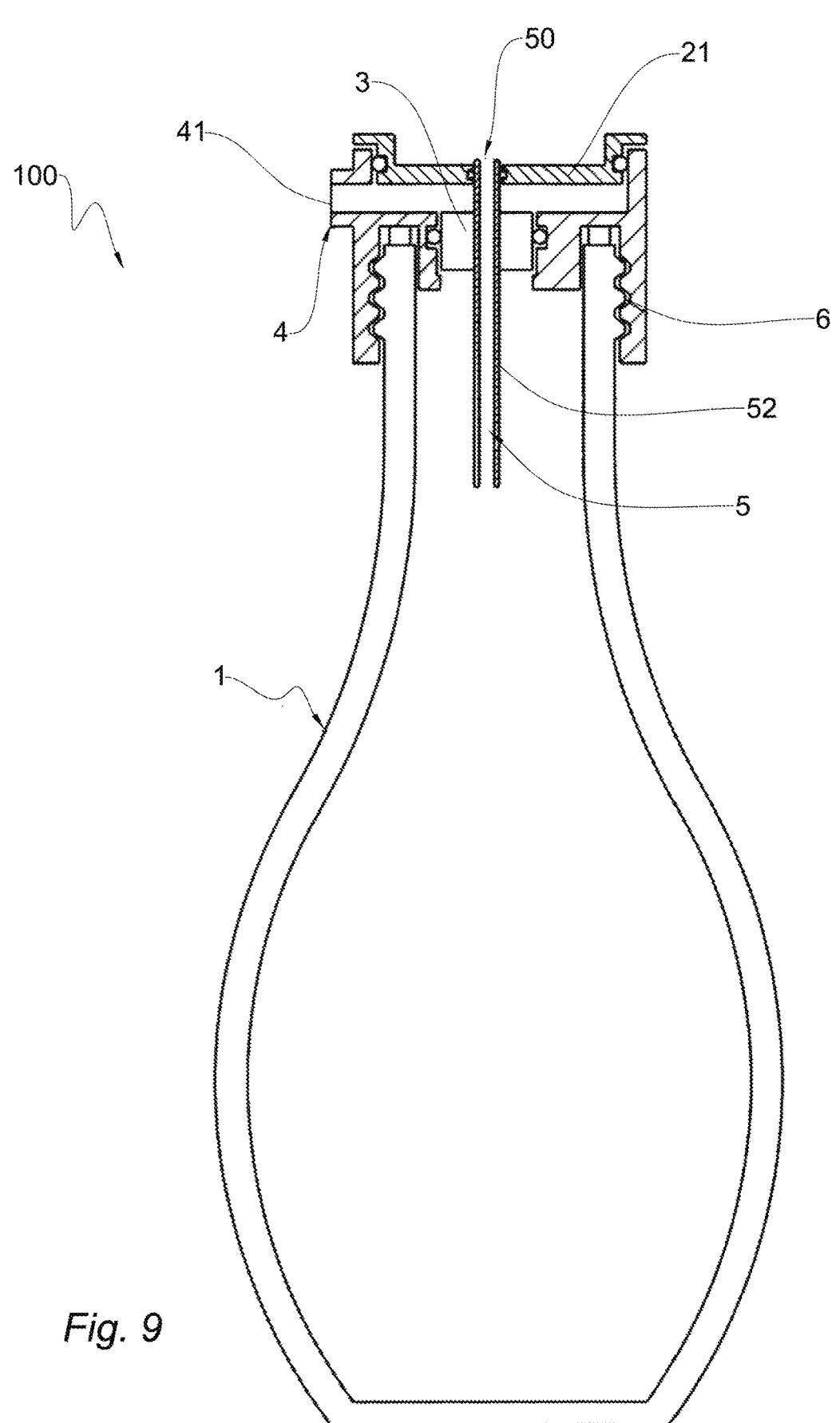
Figure 10:
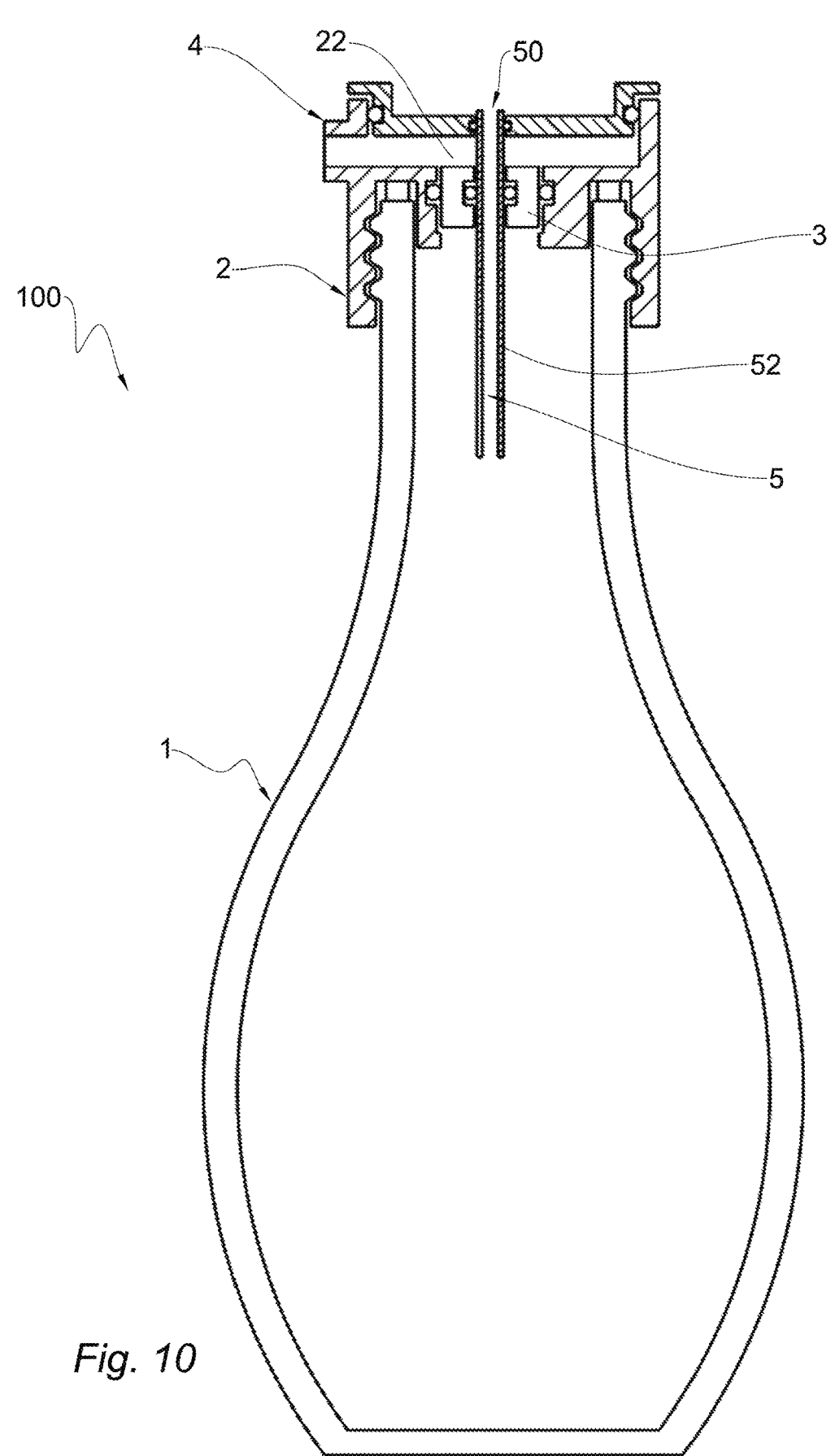

In the embodiment depicted in FIG. 9, there is used a ventilation pipe 5 similar to the one of FIG. 10, but there is instead provision for the cannula 52 and the cap 21 to be two mutually different components.

Figure 11:
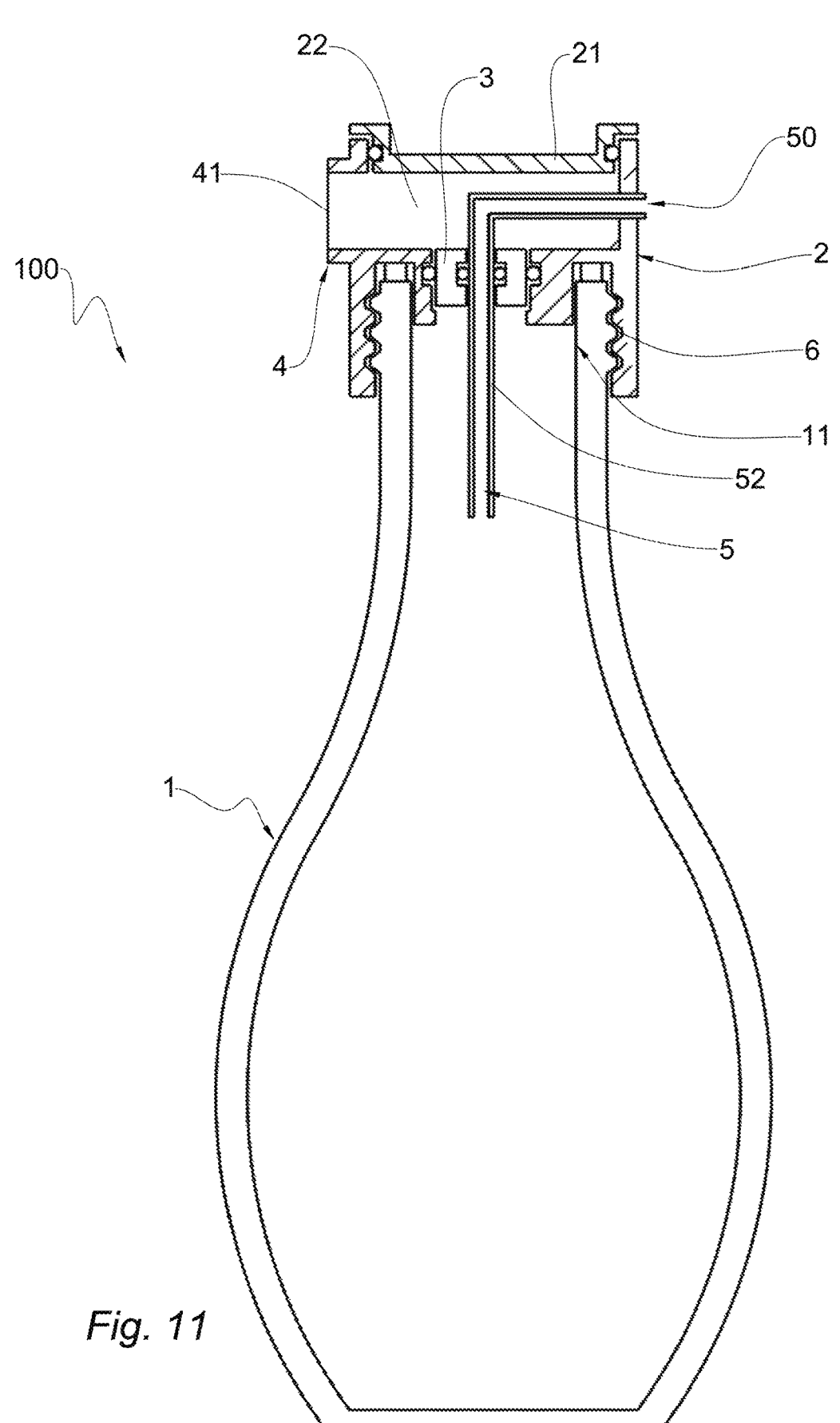

In the embodiment depicted in FIG. 10, there are used a ventilation pipe 5 and a cannula 52 which are similar to the ones of FIG. 11 but there is instead provision for the cannula 52 and the filtering element 3 to be able to be two mutually different components.

Figure 12:
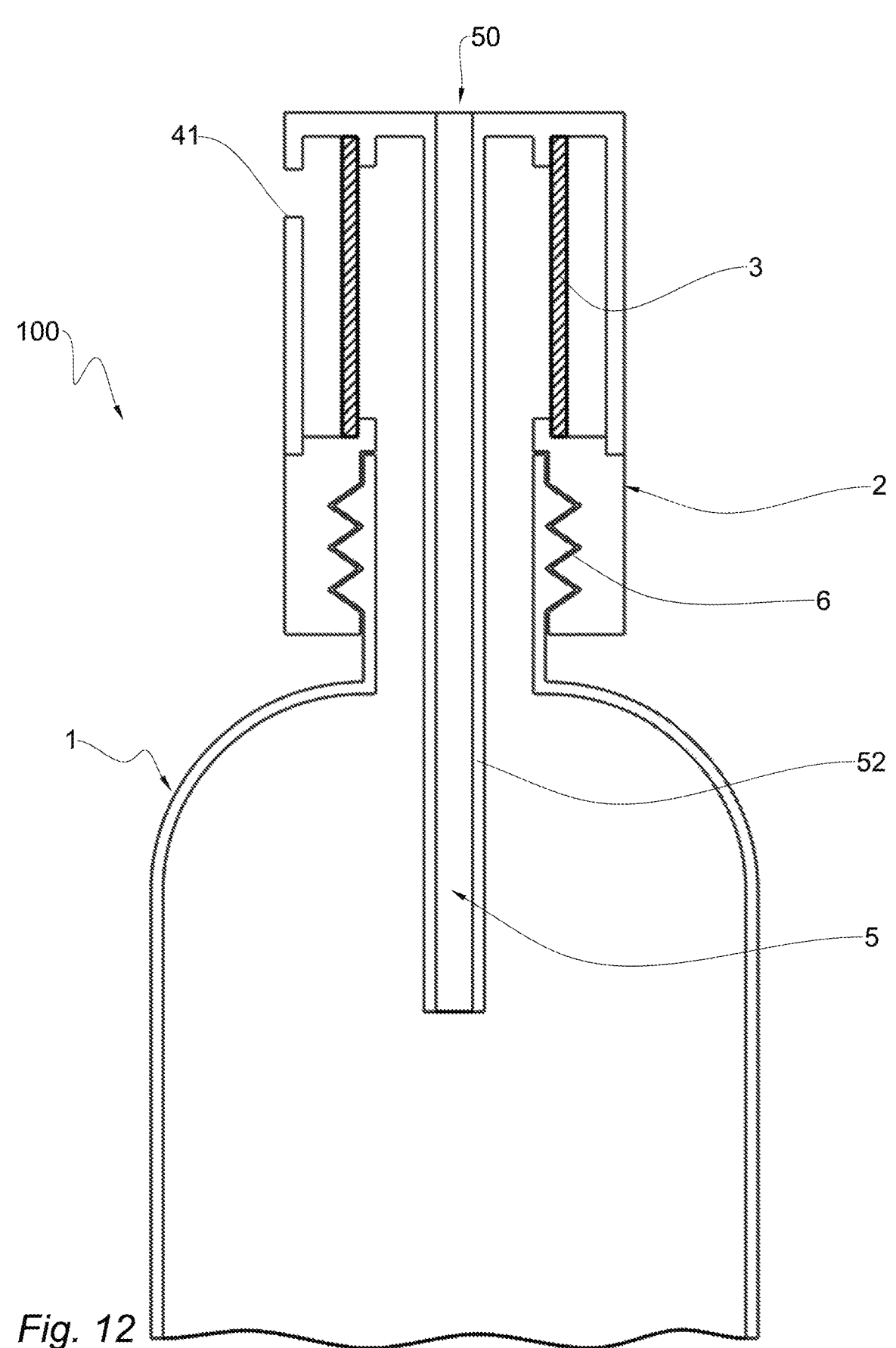

In the embodiment depicted in FIG. 11, there are used a ventilation pipe 5 and a cannula 52 which are similar to the ones of FIG. 12 but there is instead provision, when the ventilation pipe 5 extends through the storage chamber 22, for the ventilation pipe 5 to carry out a deviation through 90° in the opposite direction to the position of the spout 41. In this embodiment, consequently, the ventilation zone 50 is arranged laterally with respect to the opening 11.

Figure 13:
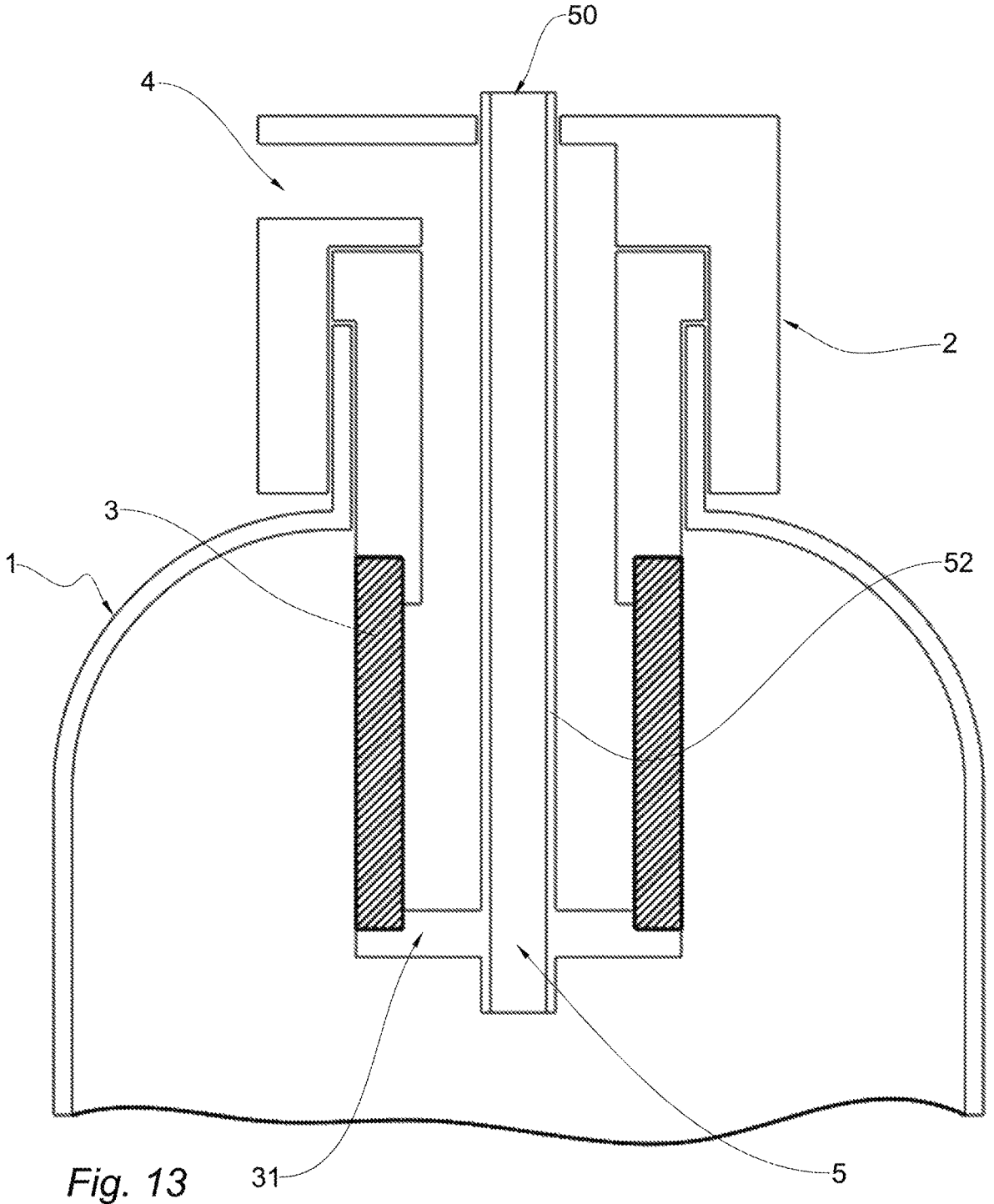

In the embodiment depicted in FIG. 13, the filtering element is completely received inside the closure group 2. The closure group 2 comprises a lower portion and an upper portion which may be separated suitably so as to allow the replacement of the filtering element 3. In this embodiment, the dispensing zone 40 is arranged in the upper portion of the closure group 2.

Figure 14:
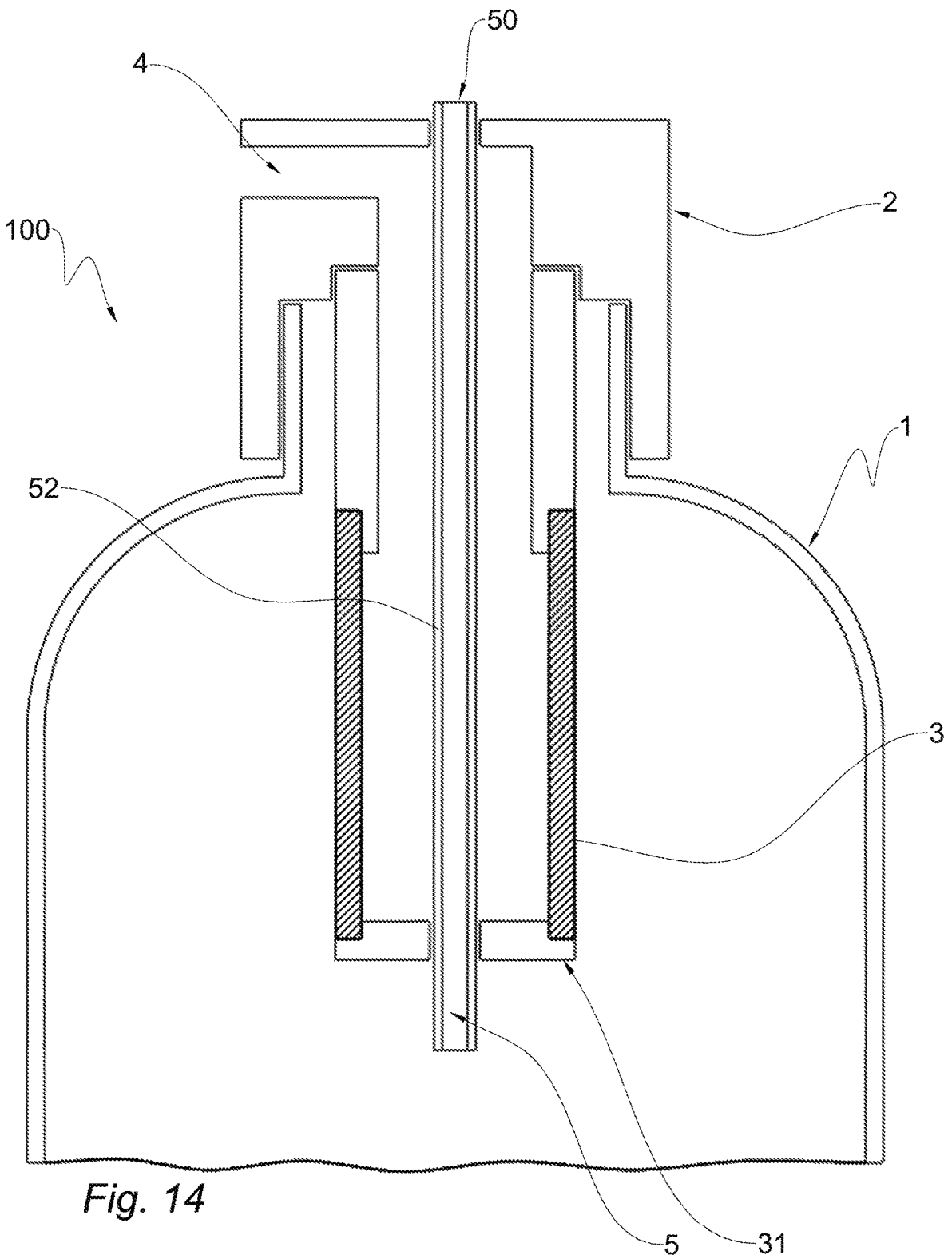
Figure 15:
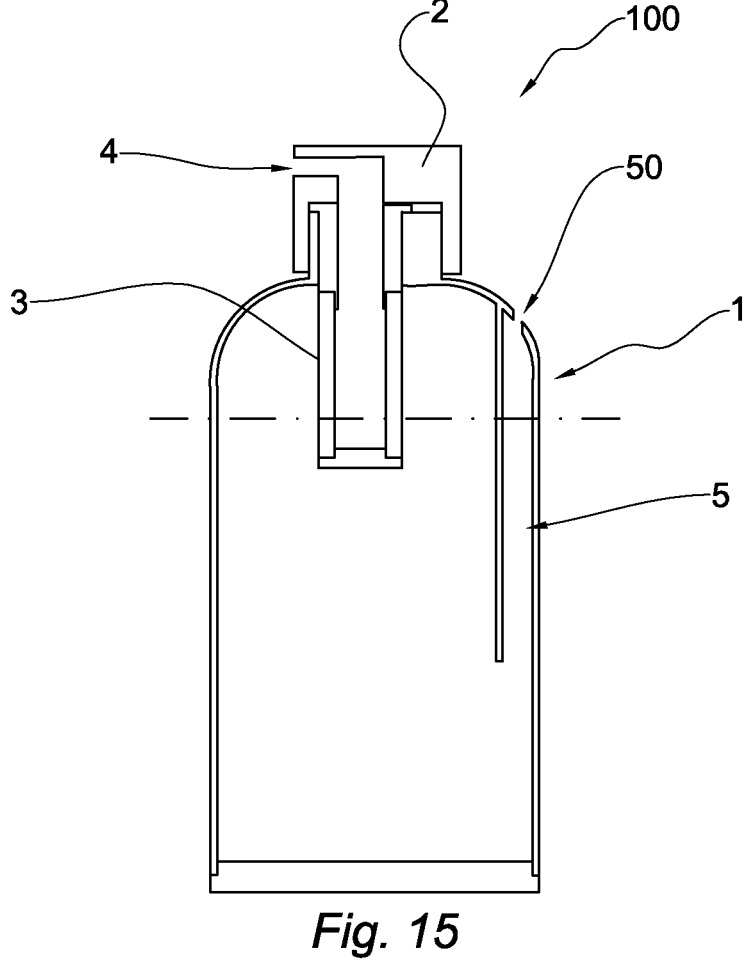
Figure 15A:
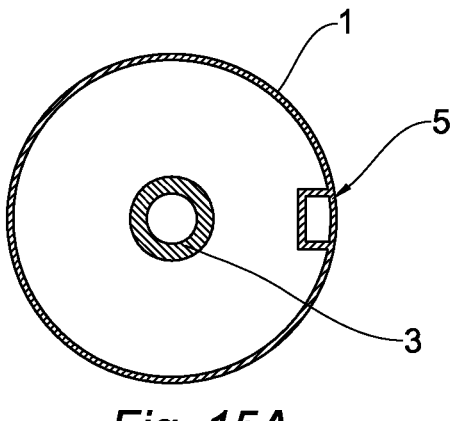
FIG. 15A is a cross-section of the container of FIG. 15.

In the embodiment depicted in FIG. 14, the filtering element 3 is fixed to a support 31, through which the ventilation pipe 5 extends, and the cannula 52 is an integral part of the support 31.

In other embodiments, there may instead be provision for a cannula 52 which is separate from the support 31 but connected thereto.

In some embodiments, the ventilation pipe may be an integral part of the main body 1. As may be observed in the example of FIG. 15, the pipe may be formed by means of a suitably shaped portion of the main body 1 which opens directly towards the exterior. In this case, there may also be provision for a non-return valve or an intermediate vent hole as in all the embodiments previously illustrated.

It will be appreciated that a filtering container constructed in this manner allows the production of filtration of water in a sufficiently rapid and immediate manner. This allows the use of the container as a normal bottle for common food uses, allowing filtered water to be poured out into glasses without requiring preliminary preparations apart from filling the jug. Additionally, the filtering element used for the present container is simple and readily replaceable by the user following wear or deterioration thereof.

The invention claimed is:

1. A filtering container for liquids, in particular water, comprising:
a main body having a side wall and defining an interior and an opening, the main body configured to contain a liquid;
a gripping portion which is configured to be gripped by a user for lifting the filtering container and pouring the liquid contained therein;
a closure group for the opening which includes a filtering element, wherein the closure group defines a housing and the filtering element is received in a removable way in the housing;
a dispensing means for the liquid which is configured in such a way that the liquid is dispensed through a dispensing zone for the liquid which is defined adjacent to the side wall of the main body, and
a ventilation pipe extending through the closure group in a position adjacent to the housing, the ventilation pipe opening at one end inside the main body in a ventilation zone and extends in the form of an elongate element towards the interior of the main body, the ventilation pipe comprising an end opening inside the main body in a distal position with respect to the opening and further comprising a non-return valve arranged at the end of the ventilation pipe opening inside the main body in order to prevent the discharge of liquid from the filtering container without it passing through the filtering element,
wherein the filtering element is arranged in a position to intercept the liquid being discharged from the main body by being located proximate the opening and the dispensing zone which is defined adjacent to the side wall of the main body so that the liquid in the filtering container wets and passes through the filtering element only when the filtering container is inclined and during discharge of the liquid from the main body, the liquid being unable to discharge from the main body without passing through the filtering element, and wherein a further opening is defined in the ventilation pipe in a region of an end of the ventilation pipe opposite to one which opens inside the main body, the further opening allowing the interior of the filtering container to be placed in communication with the exterior without passing through the filtering element.

2. The filtering container according to claim 1, wherein the ventilation pipe comprises a cannula which extends inside the main body.

3. The filtering container according to claim 1, wherein the ventilation pipe extends inside the main body over a distance (d) of $\frac{1}{15}$, of the longitudinal extent of the main body.

4. The filtering container according to claim 1, wherein the opening of the main body defines a planar surface, the dispensing zone and the ventilation pipe being arranged in opposite positions with respect to the planar surface.

5. The filtering container according to claim 1, wherein the closure group comprises a cap for alternatively affording or preventing access to the housing of the filtering element.

6. The filtering container according to claim 5, wherein there is defined between the cap and the filtering element a storage chamber in which the fluid is collected during discharge from the filtering element, the dispensing spout being arranged laterally with respect to the storage chamber.

7. The filtering container according to claim 1, wherein the ventilation pipe is formed on the main body.

8. The filtering container according to claim 1, wherein the ventilation pipe comprises an intermediate vent hole which is positioned in an intermediate position between opposite ends of the ventilation pipe.

9. The filtering container according to claim 1, wherein the closure group is removably attached to the main body in the region of the opening.

10. The filtering container according to claim 9, wherein the filtering element is connected to the closure group so as to be removed together with the closure group.

11. The filtering container according to claim 1, wherein the end of the ventilation pipe provided with the non-return valve is arranged upstream with respect to the filtering element along a discharge path of the liquid from the filtering container.

12. The filtering container according to claim 1, wherein the filtering element has a flat form.

13. The filtering container according to claim 1, wherein the filtering element has a disk-like form.

14. The filtering container according to claim 1, wherein the closure group is configured so as to intercept the discharge of the liquid through the opening of the main body.

15. The filtering container according to claim 1, wherein the opening defines a single passage for the liquid being introduced into and being discharged from the main body.

16. The filtering container according to claim 1, wherein the closure group and the dispensing means are fixedly connected.

17. The filtering container according to claim 16, wherein the dispensing means is removable from the main body together with the closure group.

18. The filtering container according to claim 1, wherein the ventilation pipe and the filtering element define passages between the interior of the main body and the exterior of the main body which are parallel and separate.

\* \* \* \* \*